July 11, 1961 R. H. MUSTONEN ET AL 2,992,375
TRACER CONTROL METHOD AND MEANS
Filed Dec. 31, 1958 2 Sheets-Sheet 1

July 11, 1961

R. H. MUSTONEN ET AL 2,992,375

TRACER CONTROL METHOD AND MEANS

Filed Dec. 31, 1958

INVENTORS
Reino H. Mustonen,
BY Robert B. Cotten, &
Glenn E. Wanttaja

Robert E. Fowler
ATTORNEY

United States Patent Office 2,992,375
Patented July 11, 1961

2,992,375
TRACER CONTROL METHOD AND MEANS
Reino H. Mustonen, Milford, Robert B. Colten, Oak Park, and Glenn E. Wanttaja, Rochester, Mich., assignors to General Motors Corporation, Detroit, Mich., a corporation of Delaware
Filed Dec. 31, 1958, Ser. No. 784,232
4 Claims. (Cl. 318—31)

This invention relates to a tracing machine control means or more particularly to a tracing machine control head which is movable over a surface contour to control follower means for reproducing the outline of the original form. There are many instances in model making, die making, and other fields in which it is desired to provide means which can be mounted in juxtaposition to a given body configuration which, when scanned over the surface, will develop a line drawing reproducing the same plane surface outline, or perhaps control cutting means for cutting out templates.

The present invention relates specifically to the tracing means which scans a surface and in combination with other means provides a control voltage for a scanning motor. In prior mechanisms, a follower or tracer head has been provided which is connected in series with a small operating motor to control the same which motor causes the probe or follower to maintain a given distance between the end of the probe and the surface being followed as further driving means causes the probe head to scan over the surface. By connecting this motor in circuit with a Selsyn motor, the outline of the surface can be developed at a remote location or cutter means may be controlled to cut out a template or any member rigidly mounted with respect to the probe or follower can trace the outline of the surface by moving with the same. In these systems, sufficient voltage is applied to draw an arc between the end of the follower probe and the surface being traced and it is the voltage across this arc which is applied to the follower control motor to cause the same to maintain a constant physical distance from the end of the probe to the surface. Thus as a main driving motor causes the probe to scan in a given plane across the surface, the tracer motor, which is of the reversible type, will either back the probe off or drive it toward the surface to maintain a substantially constant distance dependent upon the voltage between the probe head and the surface. Such apparatus may be operated satisfactorily as long as the surface being traced is electrically conductive and forms a part of the circuit. It is not, however, useful where the surface is nonconductive such as where the model is wooden or plaster of Paris.

It is therefore an object in making this invention to provide means for tracing across a nonconductive surface in a given plane which provides a control voltage for developing a similar surface contour.

It is a further object in making this invention to provide a follower head probe useful in conjunction with a nonconductive surface for controlling a tracing motor to redevelop the contour of the surface for other purposes.

With these and other objects in view which will become apparent as the specification proceeds, our invention will be best understood by reference to the following specification and claims and the illustrations in the accompanying drawing, in which:

Figure 1:
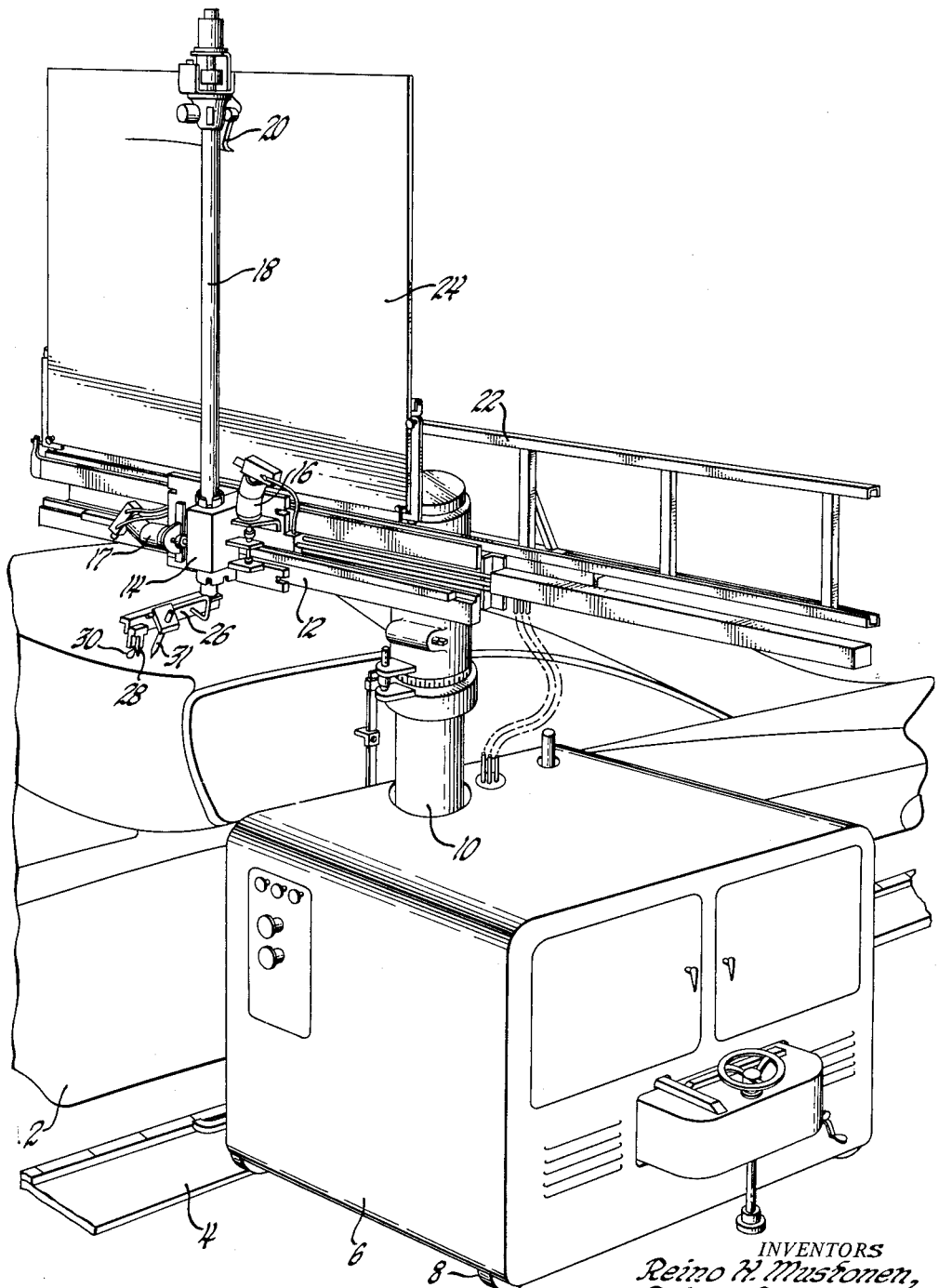
FIGURE 1 is a perspective schematic view of a contour drawing machine for tracing a surface contour which utilizes the principles of our invention.

Referring now to FIGURE 1, there is shown therein diagrammatically a machine for drawing the contour of a given model surface upon a board for any desired reference purposes. As explained earlier, the control could also be used for other purposes such as cutting out templates, developing other models, etc., and this is merely an illustrative showing of the use of the novel probe head. In FIGURE 1 there is shown a model 2 which in this case is the outline of an automotive body, which rests on a firm floor foundation. Adjacent the model 2, there is laid a track 4 along which the tracing device to be described may run in order to trace the outline of transverse planes through the model. The machine consists generally of a cabinet 6 mounted on wheels 8 which can be run longitudinally of the car. This cabinet contains various controls and motors that may be needed. Projecting vertically from the top of the cabinet 6 is a mounting post 10 carrying a transverse bar 12 which extends out over the top of the model which is the subject of investigation and study.

A movable carriage 14 is mounted on the arm 12 to move horizontally. It is driven by a small motor 16 for horizontal movement which causes it to move along the length of the bar 12 and scan a plane through the model. The carriage 14 adjustably mounts a rod 18 which may move vertically. The rod 18 is driven vertically by a second motor 17 to allow the probe to be adjusted to the general contour of the surface. The rod 18 carries the probe 28 at or near its bottom end and a stylus 20 at or near its top end. Also mounted on the post 10 is a supporting means 22 for a drawing board 24 to which paper may be attached and upon which the contour line is drawn. Thus, the stylus 20 is drawn over the surface of the paper as the carriage 14 and rod 18 moves to draw a line representative of the outline being traced. On the lower end of the rod 18 a small transverse bar 26 is mounted which carries in electrically insulated relation the tracer stylus 28 and also a small distortable wire member 30 whose purpose will be explained. Lastly, a spray nozzle 31 is mounted adjacent the tracer probe 28.

Figure 2:
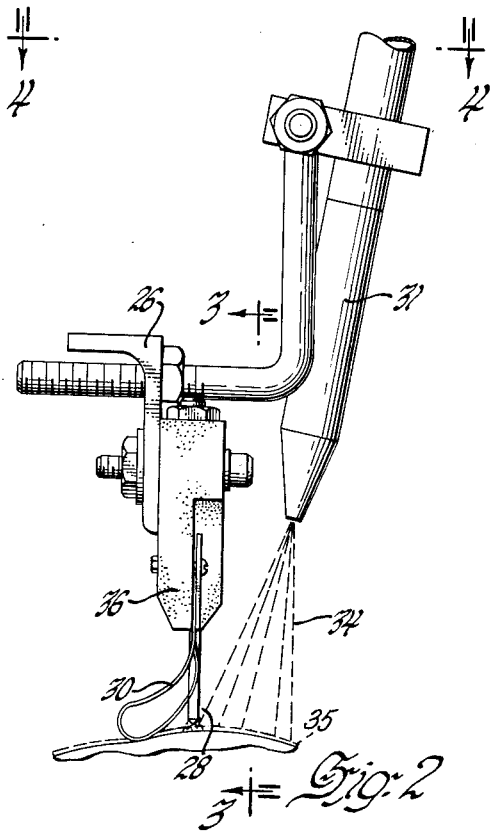
FIGURE 2 is an enlarged side elevational view showing the tracer probe head embodying our invention.

Referring now more particularly to FIGURE 2, the probe 28 is shown rigidly mounted directly on insulating block 36 carried by bracket 26 and is connected in circuit with the control servo motor. As before mentioned, the model 2 in this particular illustration is not electrically conductive and so some means must be provided to complete an electric circuit between the end of the stylus, the adjacent surface of the model and to ground or return to develop a control voltage. Certain fluids are, of course, electrically conductive. Many conductive fluids may be used but one of the simplest is a fluid which contains detergent. Therefore, if a conductive fluid can be flooded over or flows over the surface of the clay model, it will form an electrically conductive surface and a part of an electric circuit. In the present instance the fluid 34 is applied through a hollow nozzle 31 mounted on the same bracket 26 and aimed so that the fluid floods the surface as at 35 just ahead of the follower probe 28. In order to complete an electric circuit from the probe to the surface and then back to the control motor, there are provided small distortable springs 30 affixed to the side of the bracket 36 which are electrically grounded to the frame through wires 33. An electric control voltage can now be developed between the end of the probe 28 and the top surface of the model due to the fact that the surface is made conductive by a very thin fluid film 35 and then the electric circuit is completed back to the grounded frame of the machine through the springs 30.

Figure 5:
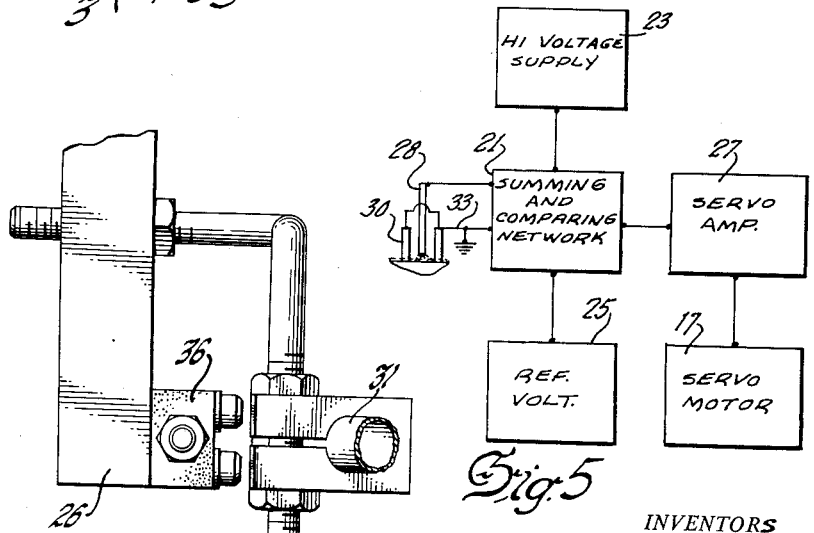
FIG. 5 is a block diagram of the servomotor control circuit between the probe follower and the reversible control motor for driving the probe follower in a path normal to the surface being traced.

Means for controlling a reversible driving motor by a variable voltage between a follower probe and surface is well known and forms no part of the present invention. However, to generally illustrate such a circuit reference is made to FIG. 5 in which the probe 28 and the conductive fluid surface of the model and return conductive springs 30 are electrically connected to a summing and comparing network 21. Also connected to this network are both a high voltage supply 23 and a reference voltage source 25. The resultant control voltage developed in the network is fed to a servo amplifier 27 connected thereto which in turn is directly connected to and controls the direction of rotation and speed of the servomotor 17. Thus as the voltage across the probe 28 and the fluid conductive surface varies, the servomotor will change speed and direction to move the probe and tracing mechanism connected thereto normal to the surface and tend to maintain the same distance as the horizontal feed motor scans the apparatus across the model. The distance from the probe 28 to the fluid film 35 must always be less than that between the probe and any part of the return conductive springs 30 or the desired results will not be obtained.

Figure 3:
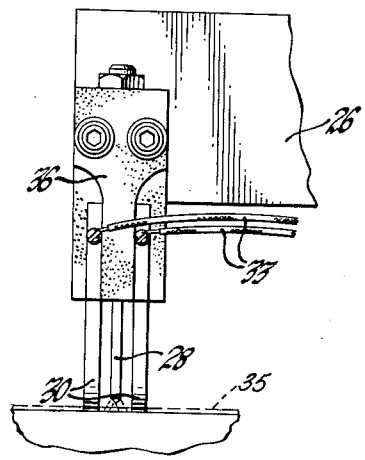
FIGURE 3 is a sectional view taken on line 3—3 of FIGURE 2.
Figure 4:
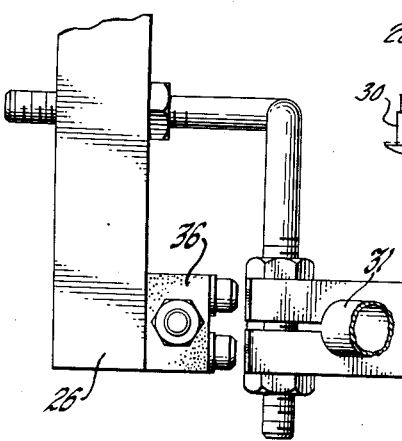
FIGURE 4 is a sectional view taken on line 4—4 of FIGURE 2.

The probe 28, of course, is insulatedly mounted on the bracket 26 through the block of insulating material 36 which may be of micarta or some other similar substance. This micarta block 36 also supports the distortable spring members 30 which are clearly shown in FIGURE 3. These springs are brought down on the surface and distorted to press against the same. They of course permit travel in either direction. The proper electrical connections can be then made to connect the follower probe 28 and the distortable grounding springs 30 into the control circuits for driving motors 16 and 17. In this manner the control voltage developed between the lower end of the probe 28 and the conductive fluid on the upper surface of the model is in series with the control motor circuit and causes the head to follow the body contour.

By this means there is provided a control voltage for operating tracing and scanning mechanism to reproduce a contour line even though the model may be of such nonconductive substance as clay, cement, wood, plastic, and so forth.

We claim:

1. In means for tracing the contour of a model of electrically nonconductive material, a movable arm, a tracing stylus mounted on said arm to reproduce the contour of the body, motive means connected in driving relation to said arm to move the same in a desired plane, a follower probe carried in insulated relation by said arm, means carried by the arm for flooding said nonconductive model surface with conductive fluid, flexible, conductive, grounding means mounted on said arm adjacent said probe extending beyond the end of the probe and conductive means connecting said probe and grounding means in an electrical control circuit to the motive means to control the same as a control voltage is developed from the probe to the surface during scanning.

2. In means for following the contour of a model of electrically nonconductive material, an arm mounted in proximity to said surface for planar movement with respect thereto, motive means for driving said arm to scan the model surface, a follower probe carried by the arm and connected in a control circuit with the motive means, means for flooding the surface of the model with a conductive fluid and flexible, ground return conductors mounted in insulating relation adjacent the follower probe to complete a control circuit from the probe to the conductive surface for controlling the motive means.

3. In means for following the surface of a model fabricated of electrically nonconductive material to reproduce an outline at a given plane, a support upon which the model rests, an arm extending over the model, a movable carriage on said arm, motive means connected to said carriage to drive the same in a plane at right angles to an axis of the model, a probe mounted on the carriage and adapted to be adjusted to a point in spaced relation to the surface of the model and electrically connected in circuit with the motive means so that the voltage across an arc drawn from the probe to the surface will control the motive means in direction and speed, means for applying conductive fluid to said surface, mounted on said carriage and flexible, grounding means also mounted on said carriage to complete the electrical circuit to control the motive means as the carriage scans over the model.

4. A method of controlling a servomotor scanning a conductive probe over the surface of a model of electrically nonconductive material including the steps of flooding said surface of the nonconductive model to be scanned with an electrically conductive fluid providing a continuous electrical ground return path to said surface applying a voltage across the probe and electrical ground return path to create an arc gap across which a voltage may be developed and comparing this voltage with a reference voltage to control the servo motor to drive the same in either direction as the voltage developed across the arc gap changes to reproduce or trace an outline of the model.

References Cited in the file of this patent

UNITED STATES PATENTS

| | | |
|---|---|---|
| 2,588,386 | Hubbard et al. | Mar. 11, 1952 |
| 2,744,225 | Rorden | May 1, 1956 |
| 2,766,413 | Young | Oct. 9, 1956 |
| 2,828,431 | Klaudy | Mar. 25, 1958 |